(12) United States Patent
Suzuki

(10) Patent No.: US 11,648,934 B2
(45) Date of Patent: May 16, 2023

(54) PARKING ASSISTANCE METHOD AND PARKING ASSISTANCE DEVICE

(71) Applicant: Nissan Motor Co., Ltd., Yokohama (JP)

(72) Inventor: Yasuhiro Suzuki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/638,096

(22) PCT Filed: Aug. 29, 2019

(86) PCT No.: PCT/JP2019/033895
§ 371 (c)(1),
(2) Date: Feb. 24, 2022

(87) PCT Pub. No.: WO2021/038790
PCT Pub. Date: Mar. 4, 2021

(65) Prior Publication Data
US 2022/0297676 A1  Sep. 22, 2022

(51) Int. Cl.
| | | |
|---|---|---|
| B60W 30/06 | (2006.01) | |
| B60W 60/00 | (2020.01) | |
| B60W 40/105 | (2012.01) | |
| B60W 50/10 | (2012.01) | |
| B60W 50/14 | (2020.01) | |

(52) U.S. Cl.
CPC .......... B60W 30/06 (2013.01); B60W 40/105 (2013.01); B60W 50/10 (2013.01); B60W 50/14 (2013.01); B60W 60/005 (2020.02); *B60W 2050/146* (2013.01); *B60W 2556/10* (2020.02)

(58) Field of Classification Search
None
See application file for complete search history.

(56) References Cited

U.S. PATENT DOCUMENTS

| | | | |
|---|---|---|---|
| 10,268,201 B2 * | 4/2019 | Iwama | G05D 1/0225 |
| 2009/0091475 A1 | 4/2009 | Watanabe et al. | |
| 2015/0039173 A1 | 2/2015 | Beaurepaire et al. | |
| 2018/0043905 A1 | 2/2018 | Kim et al. | |
| 2019/0144037 A1 | 5/2019 | Koshimura | |

FOREIGN PATENT DOCUMENTS

| | | |
|---|---|---|
| EP | 2647528 A1 | 10/2013 |
| JP | 2007-137171 A | 6/2007 |
| JP | 2012-022041 A | 2/2012 |
| JP | 2018-160125 A | 10/2018 |
| JP | 2019-008506 A | 1/2019 |
| JP | 2019-008688 A | 1/2019 |
| JP | 2019-125101 A | 7/2019 |
| KR | 10-2016-0054926 A | 5/2016 |

* cited by examiner

*Primary Examiner* — Abdhesh K Jha
(74) *Attorney, Agent, or Firm* — Young Basile Hanlon & MacFarlane, P.C.

(57) ABSTRACT

The parking assistance method using a parking assistance device includes: when parking of a subject vehicle is performed in a manual mode, detecting a parking execution state of the subject vehicle and determining, based on the parking execution state, whether or not the parking toward a target parking space is necessary again; and when a determination is made that the parking toward the target parking space is necessary again, outputting, to a user interface, guidance information for switching a parking mode of the subject vehicle from the manual mode to an automated mode.

21 Claims, 10 Drawing Sheets

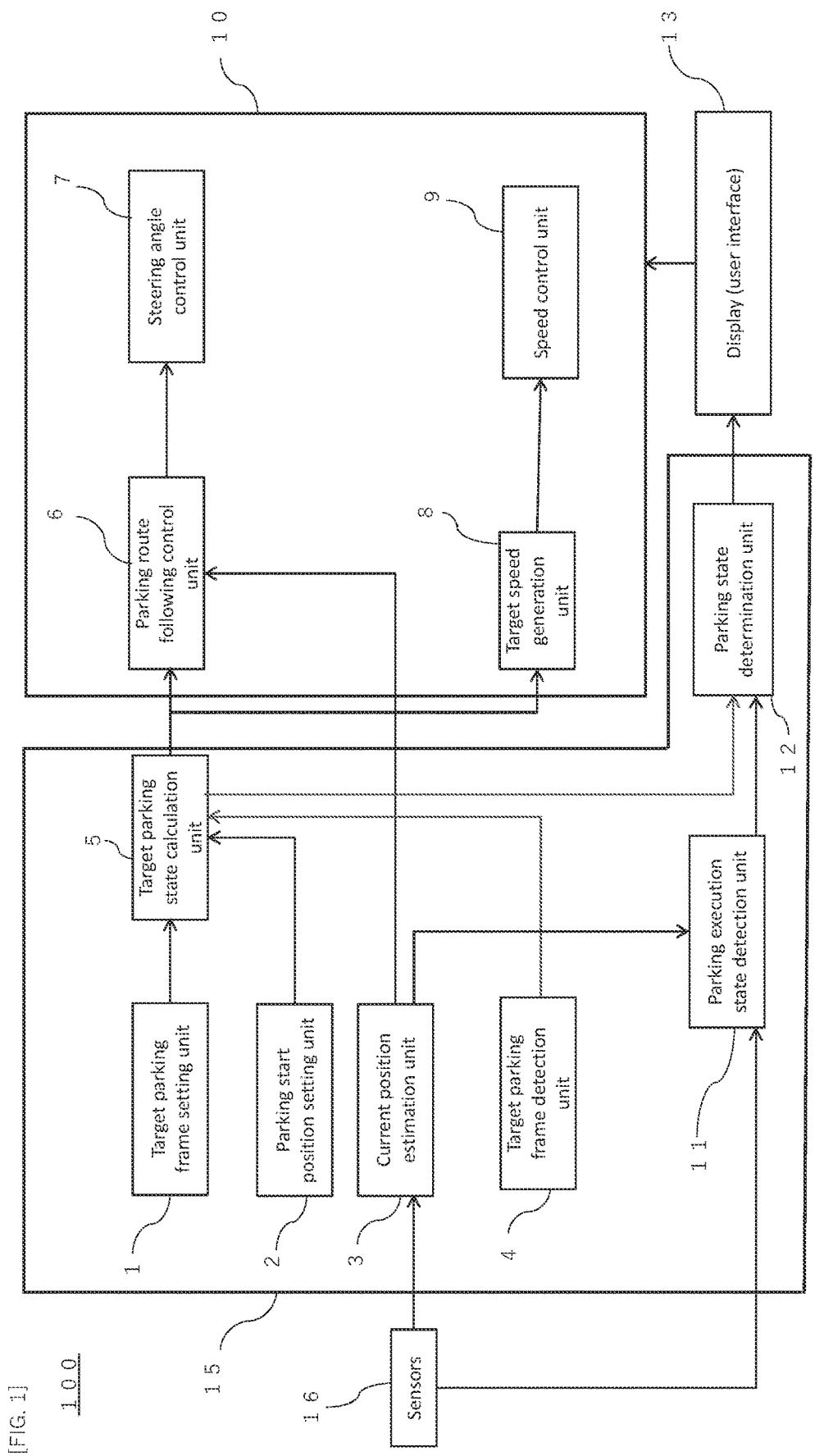

[FIG. 2]
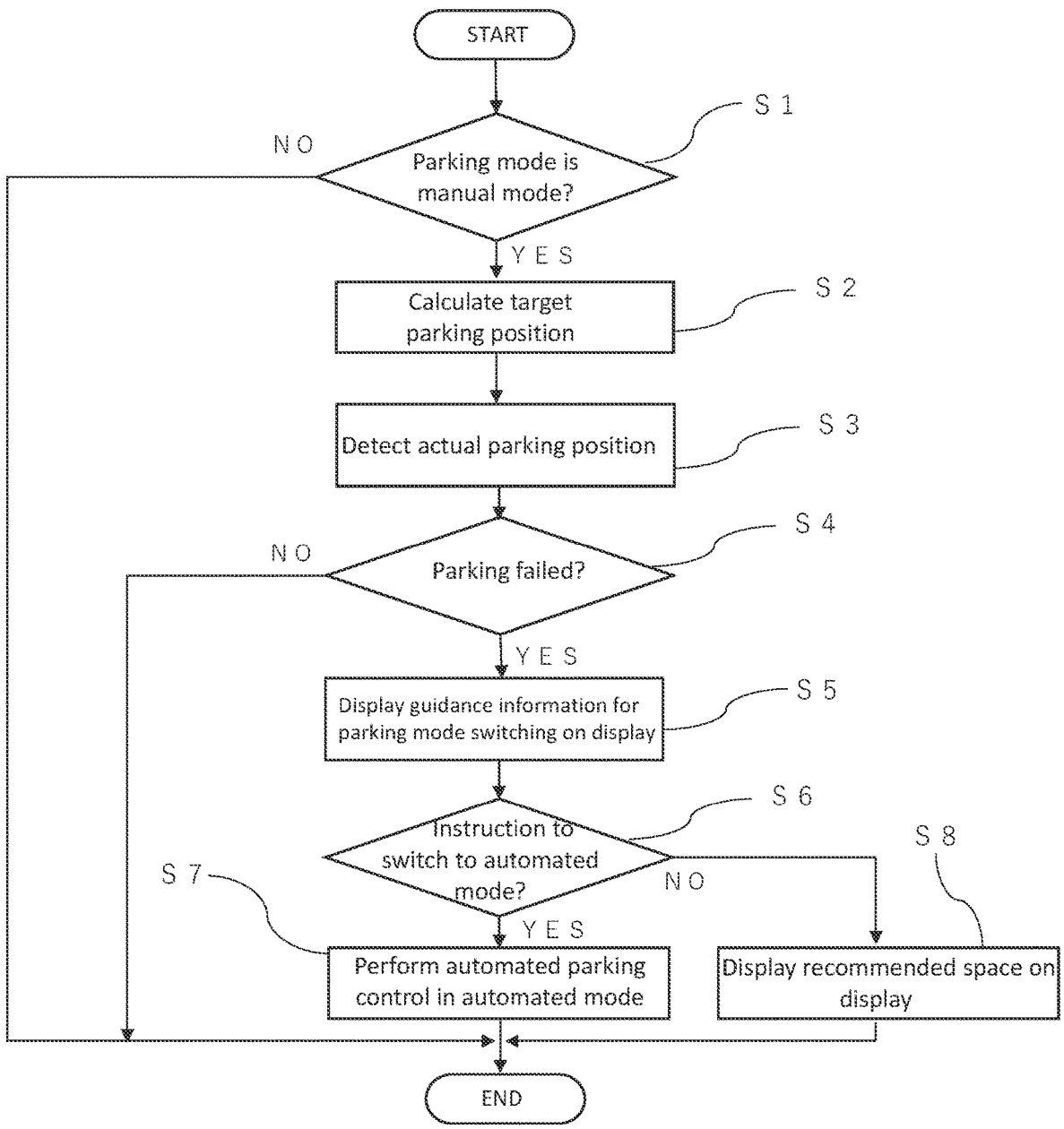

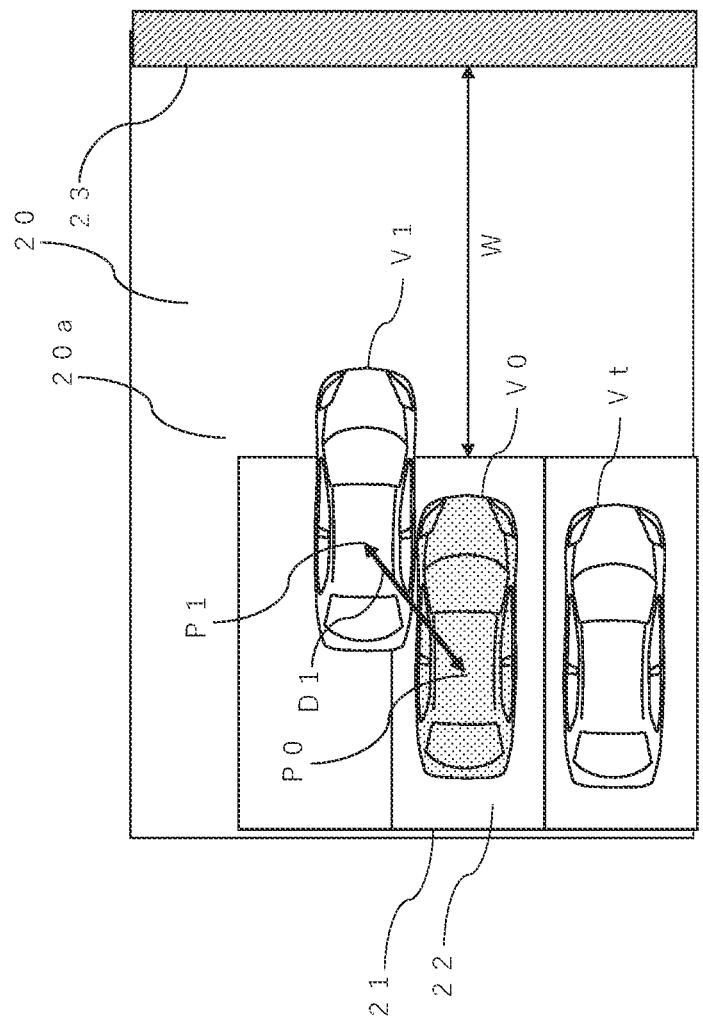
[FIG. 3]

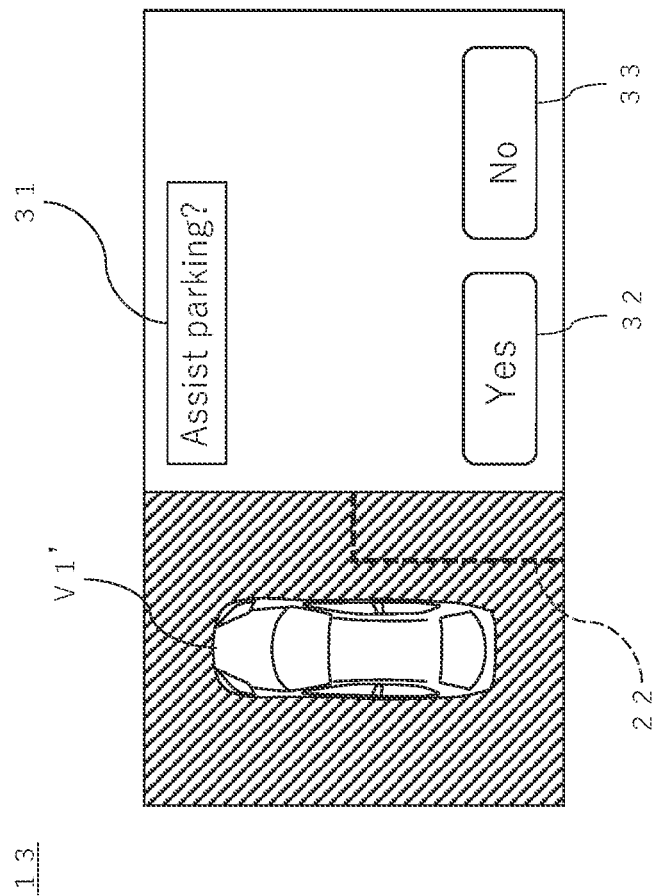

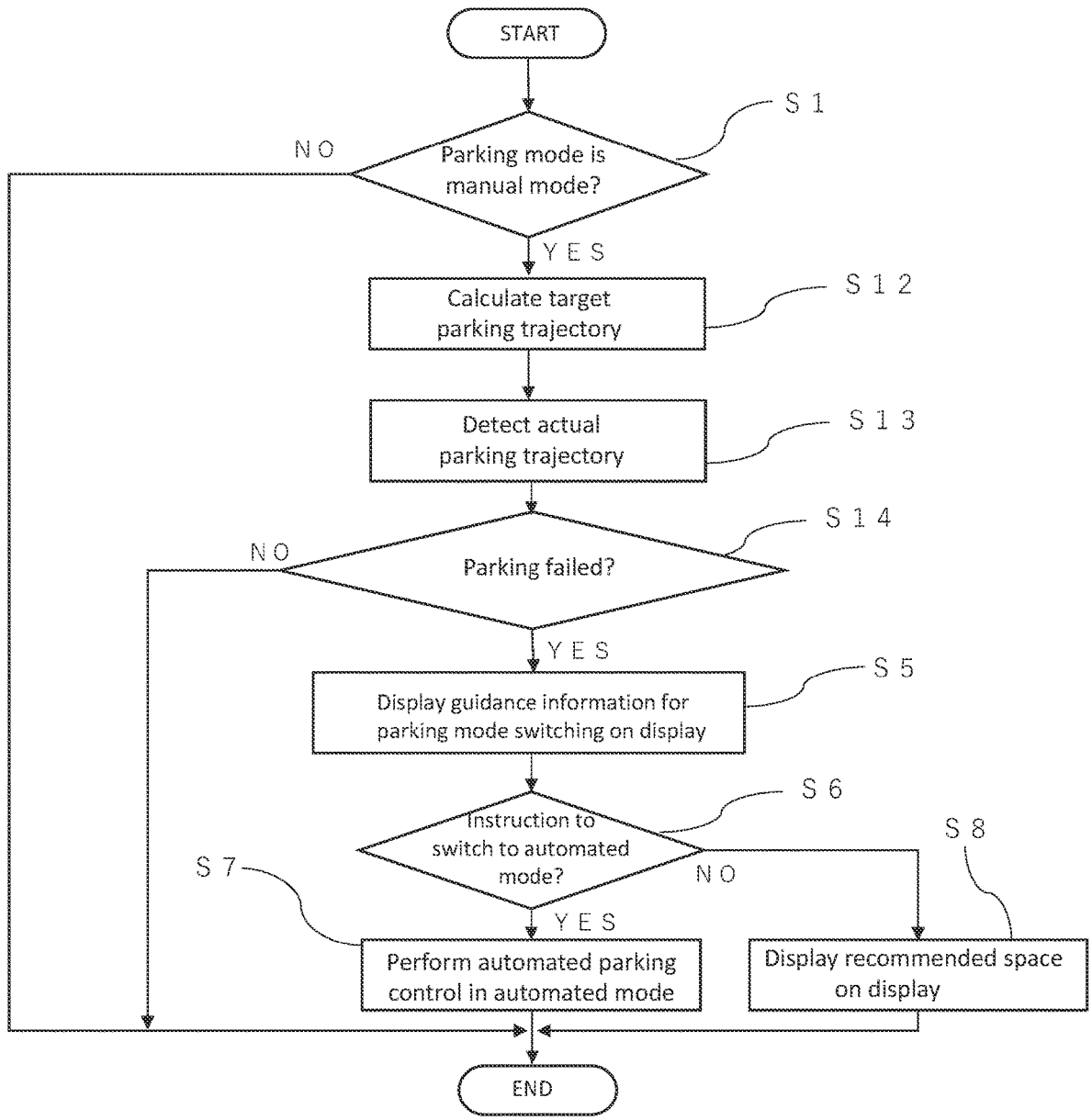

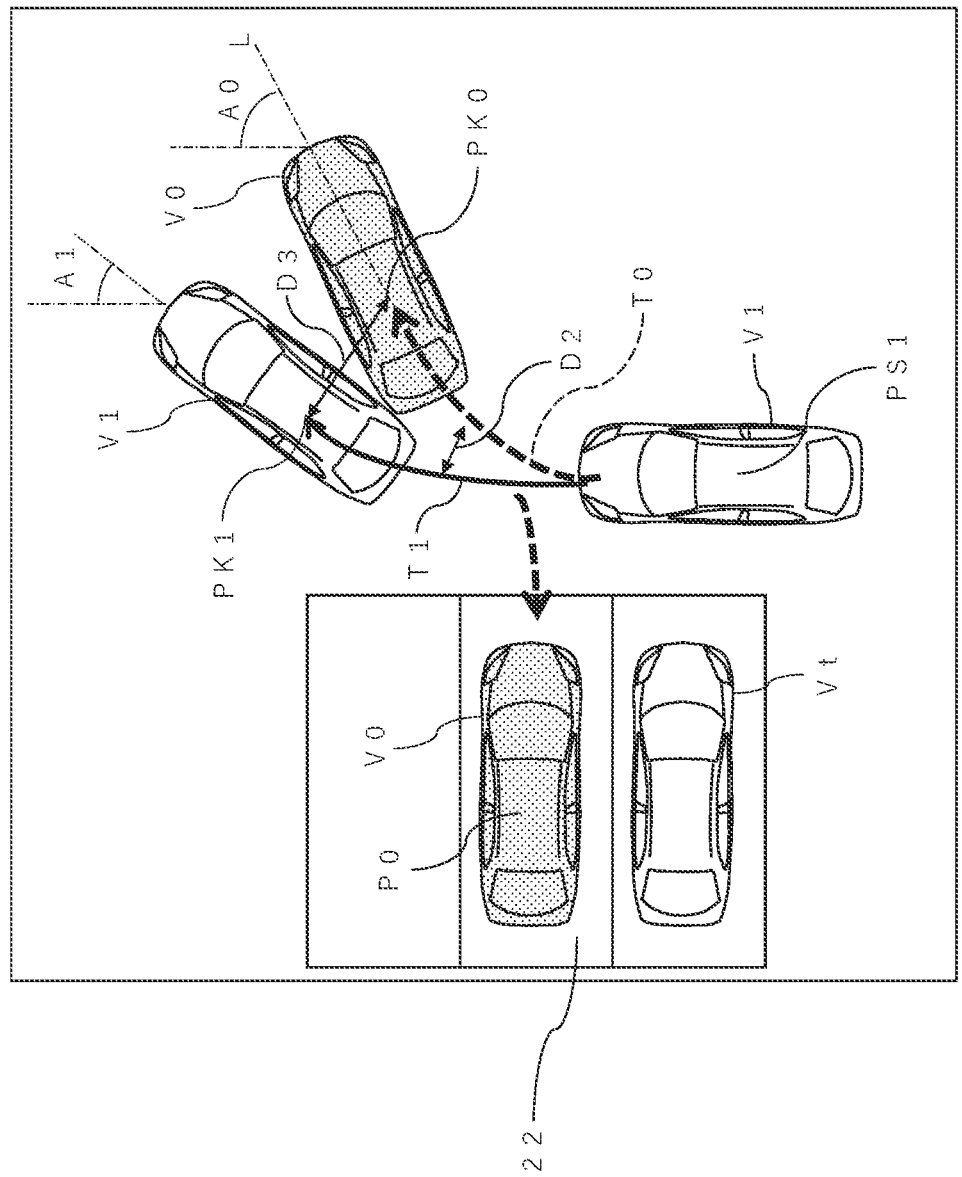
[FIG. 6]

[FIG. 7]
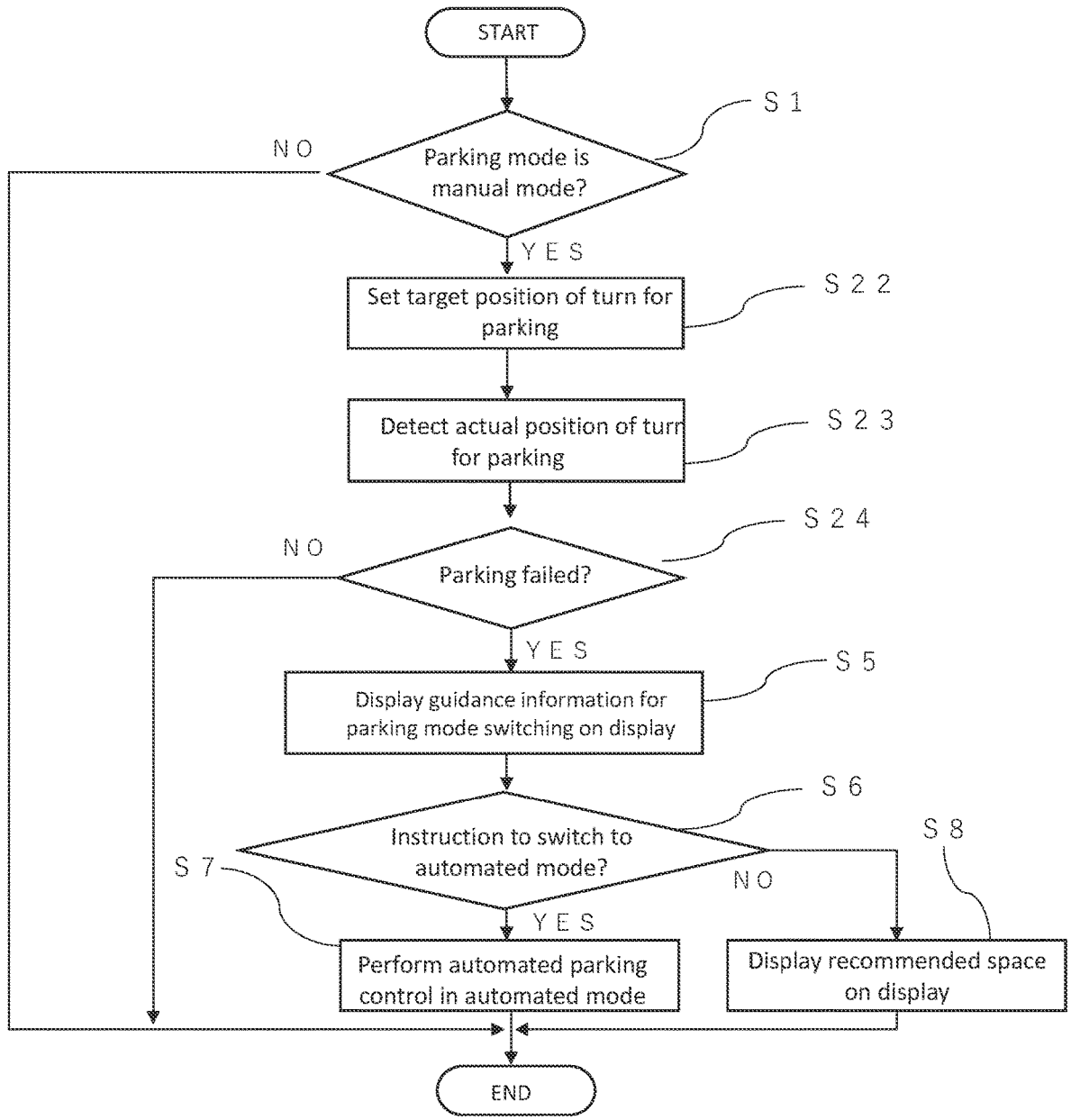

[FIG. 8]
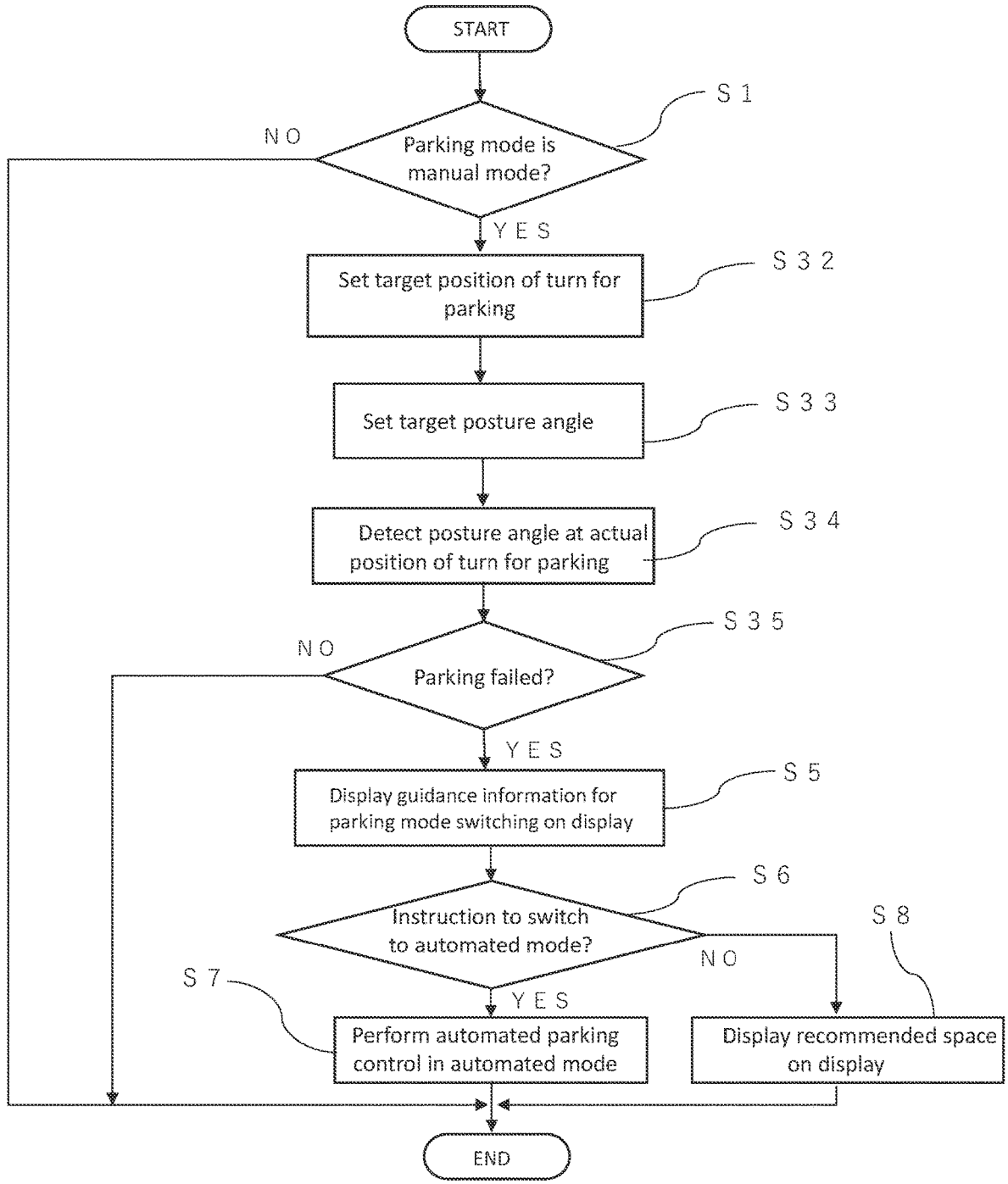

[FIG. 9]
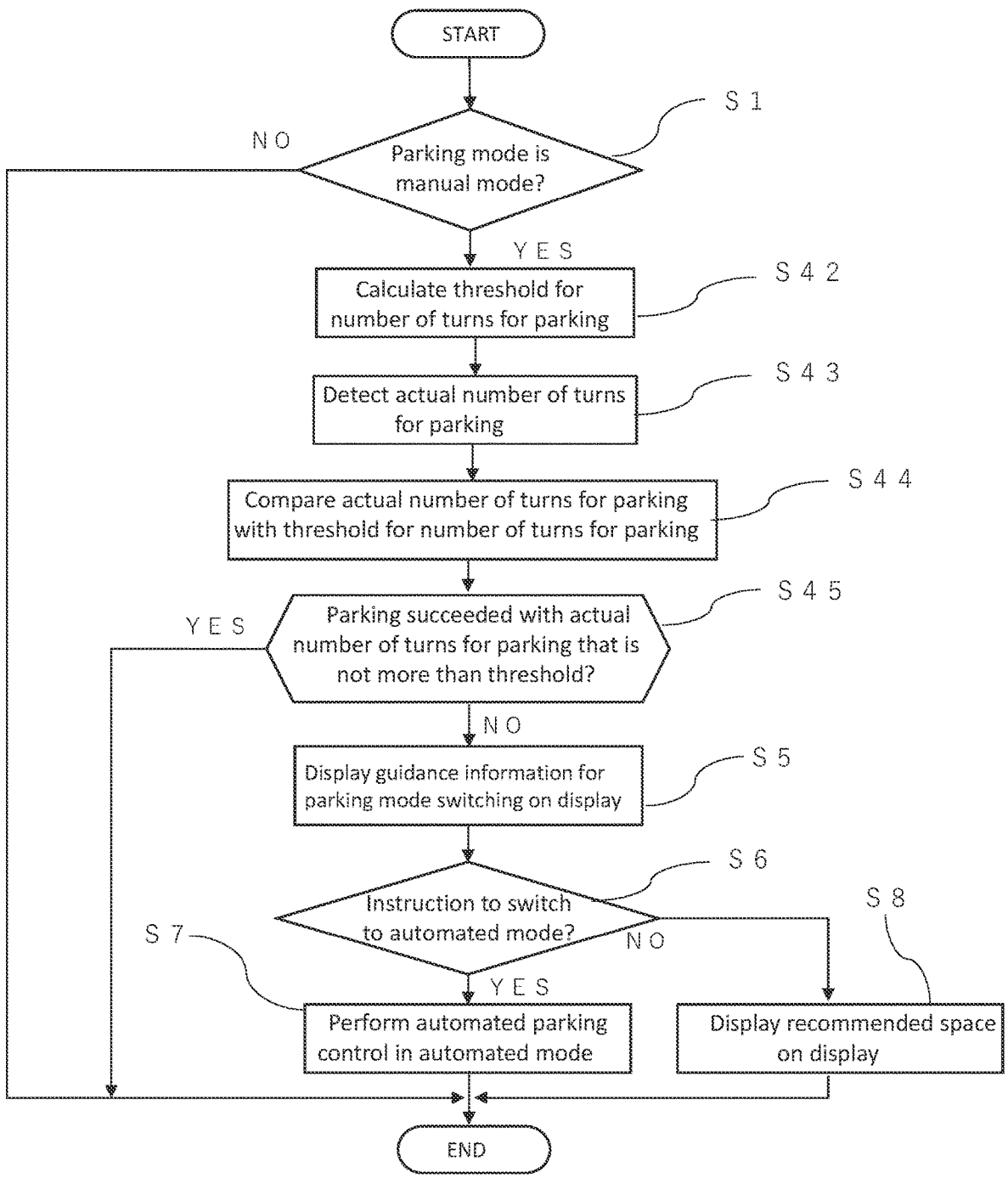

| History | Parking difficulty level | Whether manual parking has succeeded or failed | Number of turns for parking |
|---|---|---|---|
| 1 | Normal | Succeeded | Succeeded with three turns for parking |
| 2 | Difficult | Failed | Give-up with three turns for parking |
| 3 | Normal | Failed | Give-up with five turns for parking |
| 4 | Normal | Failed | Give-up with five turns for parking |
| 5 | Difficult | Failed | Give-up with four turns for parking |
| ... | | | |

PARKING ASSISTANCE METHOD AND PARKING ASSISTANCE DEVICE

TECHNICAL FIELD

The present invention relates to a parking assistance method and a parking assistance device for assisting the parking of a subject vehicle.

BACKGROUND

JP2018-160125A describes a vehicle management system which is configured to: determine whether or not a vehicle is parked in a specified parking space; and when the vehicle is not properly parked in the parking space, give a warning to a user that the parking space is different and prompt the user to retry parking.

SUMMARY

In the vehicle management system of JP2018-160125A, however, when the user manually retry the parking upon receiving the warning, the vehicle may be parked outside the parking space again depending on the surrounding situation and the driving skill of the user, which may be problematic.

A problem to be solved by the present invention is to provide a parking assistance method and a parking assistance device that are able to assist parking so that when parking in a manual mode has failed and parking toward a target parking space is necessary again, an occupant of the subject vehicle is guided to know that the parking mode is switched to an automated mode to allow the subject vehicle to be parked into the target parking space.

The parking assistance method and parking assistance device according to the present invention solve the above problem through, when the parking of a subject vehicle is performed in a manual mode, determining, based on a parking execution state, whether or not parking toward a target parking space is necessary again and presenting guidance information for switching the parking mode from the manual mode to an automated mode.

According to the present invention, an effect can be obtained that when parking toward the target parking space is necessary again after the parking in the manual mode, an occupant of the subject vehicle can be guided to know that the parking mode is switched to the automated mode.

BRIEF DESCRIPTION OF THE DRAWINGS

FIG. 1 is a block diagram illustrating the configuration of a parking assistance device according to an embodiment of the present invention;

FIG. 2 is a flowchart illustrating a parking assistance method according to a first embodiment of the present invention;

FIG. 3 is a diagram schematically illustrating an example in which a determination is made that parking toward a target parking space is necessary again in the parking assistance method illustrated in FIG. 2;

FIG. 4 is a diagram illustrating the screen of a display that presents guidance information for switching the parking mode of the subject vehicle from a manual mode to an automated mode in the parking assistance method illustrated in FIG. 2;

FIG. 5 is a flowchart illustrating the parking assistance method according to a second embodiment of the present invention;

FIG. 6 is a diagram schematically illustrating an example in which a determination is made that parking toward the target parking space is necessary again in the parking assistance method illustrated in FIG. 5;

FIG. 7 is a flowchart illustrating the parking assistance method according to a third embodiment of the present invention;

FIG. 8 is a flowchart illustrating the parking assistance method according to a fourth embodiment of the present invention;

FIG. 9 is a flowchart illustrating the parking assistance method according to a fifth embodiment of the present invention; and FIG. 10 is a diagram illustrating an example of a history of the number of turns for parking, which is used for calculation of a threshold for the number of turns for parking in the parking assistance method illustrated in FIG. 9.

DETAILED DESCRIPTION

First Embodiment

Description will be made with reference to FIGS. 1 to 4 for a parking assistance device 100 according to the first embodiment of the present invention and a parking assistance method using the parking assistance device 100.

First, the configuration of the parking assistance device 100 equipped in a vehicle will be described with reference to FIG. 1. The parking assistance device 100 has one or more computers and software installed in the computers. Specifically, the parking assistance device 100 has a ROM that stores control programs for the subject vehicle to operate autonomously to park into a set target parking space, a CPU that executes the programs stored in the ROM, and a RAM that serves as an accessible storage device.

As illustrated in FIG. 1, the parking assistance device 100 has an automated parking control unit 10, a display 13 as a user interface, and a controller 15. The controller 15 has a target parking frame setting unit 1, a parking start position setting unit 2, a current position estimation unit 3, a target parking frame detection unit 4, a target parking state calculation unit 5, a parking execution state detection unit 11, and a parking state determination unit 12. Regardless of whether the parking mode of the subject vehicle is the automated mode or the manual mode, the target parking frame setting unit 1, the parking start position setting unit 2, the current position estimation unit 3, the target parking frame detection unit 4, the target parking state calculation unit 5, the parking execution state detection unit 11, and the parking state determination unit 12 execute respective functions. In addition, the controller 15 outputs assistance information for occupants of the subject vehicle based on the traveling information of the subject vehicle detected by various sensors 16 such as a GPS unit, a gyro sensor, and a vehicle speed sensor. The display 13 presents guidance information based on the assistance information, which is output by the controller 15, to the occupants of the subject vehicle. The occupants of the subject vehicle include the driver and passengers other than the driver.

While the parking mode of the subject vehicle is the automated mode, the automated parking control unit 10 executes the automated parking function to autonomously control the steering actuator and accelerator actuator of the subject vehicle. The automated parking control unit 10 has a parking route following control unit 6, a steering angle control unit 7, a target speed generation unit 8, and a speed control unit 9. The automated parking control unit 10 has the above-described automated mode and the manual mode in which the automated parking function is executed based on an input command based on the operation of the vehicle by an occupant to control the steering actuator and accelerator actuator of the subject vehicle. The automated parking control unit 10 has a switching function for switching between the automated mode and the manual mode.

The target parking frame setting unit 1 searches for a parking frame existing around the subject vehicle. The parking frame is composed of linear lines such as white lines as parking lot lines and defines a parking space. When a plurality of parking frames is detected, the target parking frame setting unit 1 makes the operator select a desired parking frame from parking frames into which parking is possible, and outputs positional information of the selected target parking frame (such as the coordinates of the relative position from the current position of the subject vehicle and the latitude/longitude) to the target parking state calculation unit 5.

The parking start position setting unit 2 calculates from which position the automated parking control should be started in order for the subject vehicle to park inside the parking frame set by the target parking frame setting unit 1, and sets a parking start position. The setting information of the parking start position set by the parking start position setting unit 2 is output to the target parking state calculation unit 5.

The current position estimation unit 3 estimates the current position of the subject vehicle based on the traveling information of the subject vehicle detected by the sensors 16 such as the GPS unit, the gyro sensor, and the vehicle speed sensor. Specifically, the current position estimation unit 3 uses the GPS unit to detect radio waves transmitted from a plurality of satellite communications and periodically acquires the positional information of the subject vehicle. Then, the current position estimation unit 3 estimates the current position of the subject vehicle based on the acquired positional information of the subject vehicle, angle change information acquired from the gyro sensor, and the vehicle speed acquired from the vehicle speed sensor. The positional information of the subject vehicle estimated by the current position estimation unit 3 is output to the parking execution state detection unit 11 and the parking route following control unit 6 of the automated parking control unit 10 at predetermined time intervals.

The target parking frame detection unit 4 has a plurality of cameras that capture images around the subject vehicle. The target parking frame detection unit 4 detects the target parking frame, which is set by the target parking frame setting unit 1, and outputs to the target parking state calculation unit 5 information such as the shape and size of the target parking frame and information such as the shape and size of an area around the target parking frame in which the subject vehicle can move.

The target parking state calculation unit 5 calculates a target parking state based on the size of the subject vehicle (such as the vehicle width, the vehicle length, and the minimum turning radius), which is preliminarily stored, information on the target parking frame, which is acquired from the target parking frame setting unit 1 and the target parking frame detection unit 4, and the parking start position, which is set by the parking start position setting unit 2. The target parking state refers to a vehicle state for the subject vehicle to park into the target parking space. That is, the target parking state is a vehicle state to be targeted at one or more timings from the current position of the subject vehicle to the target parking space. The target parking state includes the target parking space, a target parking trajectory for the subject vehicle to reach the target parking space, a target position of turn for parking for the subject vehicle to park into the target parking space, a target posture angle at the target position of turn for parking, and a threshold for the number of turns for parking for the subject vehicle to park into the target parking space. The target parking state calculation unit 5 outputs information on the target parking state to the parking route following control unit 6 and target speed generation unit 8 of the automated parking control unit 10 and the parking state determination unit 12.

The parking execution state detection unit 11 determines, based on the traveling information detected by the sensors 16 or the like, whether or not the parking of the subject vehicle is performed in the manual mode. When the parking of the subject vehicle is performed in the manual mode, the parking execution state detection unit 11 refers to the traveling information and information on the current position, which is estimated by the current position estimation unit 3, to detect as a parking execution state the vehicle state at one or more positions or timings from the start to completion of the parking operation of the subject vehicle. The parking execution state is a state of the subject vehicle when the parking of the subject vehicle is performed in the manual mode. The parking execution state includes the current position of the subject vehicle, an observed actual parking position when the subject vehicle completes parking, an actual parking trajectory related to the actual movement of the subject vehicle, an actual position of turn for parking due to the actual parking operation of the subject vehicle, an actual posture angle at the actual position of turn for parking, and an actual number of turns for parking due to the actual parking operation of the subject vehicle. The "detection of the parking execution state" includes storing the detected parking execution state as a history and referring to the stored past history when detecting the current parking execution state. The "one or more positions or timings from the start to completion of the parking operation of the subject vehicle" include at least one or two or more of (1) the start position or timing at which the subject vehicle starts the parking operation, (2) the parking position or stop timing at which the subject vehicle makes a stop after the parking is completed, and (3) the position or timing of turn for parking when the operation of turn for parking is performed midway through the parking operation.

When the parking of the subject vehicle is performed in the manual mode, the parking state determination unit 12 determines, based on the parking execution state detected by the parking execution state detection unit 11, whether or not parking toward the target parking space is necessary again (whether or not parking needs to be retried). The case in which "parking toward the target parking space is necessary again" refers to a case in which a determination is made that an execution process of parking in the automated mode is necessary again after the parking of the subject vehicle is performed in the manual mode, that is, a case in which the subject vehicle has failed to park in the manual mode.

Specifically, the parking state determination unit 12 compares the target parking state calculated by the target parking state calculation unit 5 with the parking execution state detected by the parking execution state detection unit 11 and determines, based on the difference between the target parking state and the parking execution state, whether or not the subject vehicle has failed to park, that is, whether or not parking toward the target parking space is necessary again. When the difference between the target parking state and the parking execution state is not less than a preliminarily set evaluation threshold for a parking process, the parking state determination unit 12 determines that the parking of the subject vehicle has failed, that is, parking toward the target parking space is necessary again. The evaluation threshold for the parking process refers to a reference value of the difference that is acceptable for the subject vehicle to park into the target parking space when there is a difference between the target parking state and the parking execution state. The evaluation threshold can be calculated based on an ideal vehicle state when the subject vehicle is moved to the target parking space. Cases in which "a determination is made that the subject vehicle has failed to park," that is, cases in which "parking toward the target parking space is necessary again" include a case in which the actual parking position when the parking is actually completed deviates from the target parking space and a case in which it is predicted that the actual parking position will deviate from the target parking space if the parking operation is continued without any modification.

The evaluation threshold can be set, for example, based on any one or two or more of the following factors (1) to (4):

(1) a distance with reference to the target parking space;

(2) a distance with reference to a reference trajectory leading to the target parking space;

(3) a distance with reference to a position of turn for parking on the reference trajectory leading to the target parking space; and (4) an orientation (posture) of the subject vehicle with reference to a posture angle at the position of turn for parking on the reference trajectory leading to the target parking space.

Additionally or alternatively, one evaluation threshold may be set through weighting respective evaluation thresholds that are set based on one or two or more of the above (1) to (4) and summing up these evaluation thresholds.

The reference trajectory is a target parking trajectory calculated from a parking program that is preliminarily stored for executing the automated mode.

The display 13 is a user interface that presents information used by the driver for driving or the like, such as information on the current position of the subject vehicle, information on the vehicle state, and traffic information. Additionally or alternatively, the display 13 may be a touch panel display, and various instructions and selections can be input by an occupant of the subject vehicle touching and operating the screen of the display 13. When the parking state determination unit 12 determines that the parking of the subject vehicle has failed, the display 13 presents guidance information for switching the parking mode of the subject vehicle from the manual mode to the automated mode. That is, when determining that parking toward the target parking space is necessary again, the controller 15 outputs to the display 13 the guidance information for switching the parking mode of the subject vehicle from the manual mode to the automated mode. The guidance information includes a confirmation display with which it is possible to select whether or not to switch the parking mode of the subject vehicle from the manual mode to the automated mode. When an occupant of the subject vehicle inputs an instruction to switch the parking mode of the subject vehicle to the automated mode on the display 13 based on that confirmation display, the parking mode of the subject vehicle is switched from the manual mode to the automated mode, and the automated parking control unit 10 executes the automated parking function. This allows the parking assistance device 100 to assist the parking by executing the parking control for the subject vehicle to head for the target parking space.

The parking route following control unit 6 of the automated parking control unit 10 calculates, based on the information on the target parking state acquired from the target parking state calculation unit 5 and the current position of the subject vehicle acquired from the current position estimation unit 3, a target steering angle for the subject vehicle to park into the target parking space while maintaining the target parking state. The parking route following control unit 6 calculates the target steering angle in accordance with the current position of the subject vehicle at predetermined time intervals and outputs the target steering angle to the steering angle control unit 7. The steering angle control unit 7 generates, based on the target steering angle acquired from the parking route following control unit 6, a control signal for controlling the steering actuator of the subject vehicle.

The target speed generation unit 8 of the automated parking control unit 10 calculates, based on the information on the target parking state acquired from the target parking state calculation unit 5, a target vehicle speed for the subject vehicle to park into the target parking space while maintaining the target parking state. The speed control unit 9 generates, based on the target vehicle speed acquired from the target speed generation unit 8, a control signal for controlling the accelerator actuator of the subject vehicle.

In the automated mode, control of the steering actuator by the steering angle control unit 7 and control of the accelerator actuator by the speed control unit 9 are performed concurrently, and the subject vehicle is thereby operated autonomously and guided so as to park into the set target parking space.

An example of the parking assistance method for the subject vehicle executed by the parking assistance device 100 will then be described with reference to FIGS. 2 to 4. The following description will be made based on an example in which a subject vehicle V1 parks in a parking lot 20 illustrated in FIG. 3. FIG. 3 illustrates the subject vehicle V1 which is actually parking at an actual parking position P1 as well as a virtual subject vehicle V0 when it is assumed that the subject vehicle V1 parks at a target parking position P0 in a target parking space 22 based on the target parking state and another vehicle Vt that has parked in the parking lot 20 prior to the subject vehicle.

First, in step S1 illustrated in FIG. 2, the parking state determination unit 12 of the parking assistance device 100 determines whether or not the parking mode of the subject vehicle V1 is the manual mode. Here, when the parking mode is not the manual mode but the automated mode, autonomous parking assistance is already performed by the parking assistance device 100, and therefore the control for outputting the guidance information for switching the parking mode is concluded. The determination as to whether or not the parking mode of the subject vehicle V1 is the manual mode may be performed based on whether an occupant selects the automated mode, whether an occupant selects the manual mode, whether there is a flag signal or a control signal that is output when the parking is performed in the automated mode, whether an occupant operates a switch for input in a configuration in which the automated control is executed when the occupant operates the switch for input, or the like.

On the other hand, when a determination is made that the parking mode is the manual mode, in step S2, the target parking state calculation unit 5 of the parking assistance device 100 calculates the target parking position P0 based on the position of a target parking frame 21 that is set by the target parking frame setting unit 1 and the range of a target parking space 22 that is defined inside the target parking frame 21. Then, the control transitions to step S3, in which the parking execution state detection unit 11 of the parking assistance device 100 detects the actual parking position P1 of the subject vehicle V1.

The order of step S2 and step S3 illustrated in FIG. 2 may be reversed, or these steps may be executed concurrently.

Even when a determination is made that the parking mode is the manual mode, the parking assistance device 100 executes a process necessary for the parking assistance in the automated mode in preparation for switching from the manual mode.

The control transitions to step S4, in which, as illustrated in FIG. 3, the parking state determination unit 12 of the parking assistance device 100 determines, based on the difference between the target parking position P0 and the actual parking position P1, that is, a distance D1, whether or not the parking has failed. Specifically, when the distance D1 is not less than a preliminarily set evaluation threshold for the parking process, a determination is made that the parking of the subject vehicle V1 in the manual mode has failed and parking toward the target parking space 22 is necessary again. Here, when the distance D1 is less than the preliminarily set evaluation threshold for the parking process, that is, when the subject vehicle V1 succeeds in parking, the control is concluded.

The parking assistance device 100 calculates a parking difficulty level for the target parking space 22 based on the size of the target parking space 22 illustrated in FIG. 3 and calculates the evaluation threshold based on the parking difficulty level. That is, the wider the target parking space 22, the lower the parking difficulty level, and the narrower the target parking space 22, the higher the parking difficulty level. Additionally or alternatively, the parking difficulty level for the target parking space 22 may be calculated based on the size of a surrounding space 20a adjacent to the target parking space 22, and the evaluation threshold may be calculated based on the parking difficulty level. The size of the surrounding space 20a is calculated based on a distance W between a wall 23 of the parking lot 20 and the target parking frame 21, the number and positions of other vehicles Vt parked around the target parking space 22, the sizes of the other vehicles Vt, etc.

Additionally or alternatively, the parking difficulty level may be set lower as the driver has more years of driving experience or total travel distance. Additionally or alternatively, when the driver's age is older than a predetermined age, the parking difficulty level may be adjusted to be high.

When the parking has failed, the control transitions to step S5, in which, as illustrated in FIG. 4, the guidance information for switching the parking mode from the manual mode to the automated mode is output to the display 13. Then, in step S6, a determination is made as to whether or not there is an instruction to switch the parking mode from the manual mode to the automated mode. Specifically, the guidance information output to the screen of the display 13 includes confirmation displays 31, 32, and 33 with which it is possible to select whether or not to switch the parking mode of the subject vehicle V1 from the manual mode to the automated mode. That is, a graphic image V1' of the subject vehicle V1 is displayed on the left side of the screen of the display 13, and the confirmation displays 31, 32, and 33 are displayed on the right side. The confirmation display 31 is a display for confirming with an occupant whether or not the parking mode should be changed from the manual mode to the automated mode to perform the parking assistance by the parking assistance device 100. The confirmation display 32 is a button display with which the occupant answers "Yes" to a query on the confirmation display 31 thereby to input an instruction to switch the parking mode from the manual mode to the automated mode. On the other hand, the confirmation display 33 is a button display with which the occupant answers "No" to the query on the confirmation display 31 thereby to select an option of not inputting an instruction to switch the parking mode to the automated mode. That is, the occupant answers "No" to the query on the confirmation display 31 and thereby selects the manual mode as the parking mode. Also when the occupant does not perform any operation until a certain period of time elapses after the guidance information for switching the parking mode is output to the display 13, a determination is made due to the timeout that the occupant has not input an instruction to switch the parking mode to the automated mode. Thus, in step S6, when the occupant touches the confirmation display 32, a determination is made that there is an instruction to switch the parking mode of the subject vehicle V1 from the manual mode to the automated mode.

Here, when whether or not to switch the parking mode of the subject vehicle V1 is selected on the display 13 based on the confirmation display 32, information indicating that either the manual mode or the automated mode is selected is output to the display 13 based on the information selected by the occupant of the subject vehicle.

To give priority to the driver's intention of manual driving, the parking assistance device 100 does not output the guidance display for switching the parking mode to the display 13 until a determination is made that the parking has failed. The guidance display for switching the parking mode is output at the timing when the parking is completed and the subject vehicle V1 makes a stop.

When the instruction to switch to the automated mode is input to the display 13, the control transitions to step S7, in which the automated parking control unit 10 of the parking assistance device 100 executes the automated parking function to assist retrial of parking so that the subject vehicle V1 can be parked at the parking position P0 in the target parking space 22. That is, when determining that it is necessary to move toward the target parking space 22 again, the parking assistance device 100 outputs the guidance information to the display 13, then switches the parking mode of the subject vehicle V1 from the manual mode to the automated mode, and executes the parking control for the subject vehicle V1 to park into the target parking space 22. When the occupant of the subject vehicle selects the automated mode as the parking mode, the display 13 displays an assistance image indicating the target parking space 22.

On the other hand, when the instruction to switch to the automated mode is not input to the display 13, the control transitions to step S8, in which the parking mode is maintained in the manual mode, and the target parking space 22 is displayed on the screen of the display 13 as a recommended space. The recommended space is a manual parking guidance display based on the target parking state. The manual parking guidance display when the parking mode is the manual mode may include a display of a reference trajectory, a target position of turn for parking, etc. in addition to the recommended space. The manual parking guidance including the recommended space is not displayed on the display 13 until a determination is made in step S4 that the parking has failed. That is, the manual parking guidance display is displayed on the display 13 only when the instruction to switch the parking mode to the automated mode is not input in step S6.

As described above, in the parking assistance method according to the present embodiment, when the parking of the subject vehicle V1 is performed in the manual mode, the controller 15 of the parking assistance device 100 determines, based on the parking execution state, whether or not the parking toward the target parking space 22 is necessary again. When determining that the parking toward the target parking space 22 is necessary again, the controller 15 outputs, to the display 13, guidance information for switching the parking mode of the subject vehicle V1 from the manual mode to the automated mode. This allows the parking assistance device 100 to assist parking so that when the parking in the manual mode has failed after an attempt to park, that is, when parking toward the target parking space 22 is necessary again, an occupant is guided to know that the parking mode is switched to the automated mode.

When the parking of the subject vehicle V1 is performed in the manual mode, the parking assistance device 100 calculates the target parking position P0 in the target parking space 22 as the target parking state. In addition, the parking assistance device 100 detects the actual parking position P1 when the subject vehicle V1 completes parking as the parking execution state. Then, on the basis of the amount of deviation, that is, the difference between the target parking position P0 and the actual parking position P1, the parking assistance device 100 outputs to the display 13 the guidance information for switching the parking mode of the subject vehicle V1 from the manual mode to the automated mode. Through this operation, when a deviation occurs between the target parking position P0 and the actual parking position P1, that is, when a determination is made that the parking in the manual mode has failed and parking toward the target parking space 22 is necessary again, the parking assistance device 100 guides an occupant of the subject vehicle to know that the parking mode is switched to the automated mode. This allows the parking assistance device 100 to execute the automated parking function based on the guidance information for switching the parking mode to the automated mode, and the parking assistance device 100 can assist parking so that the subject vehicle V1 can reliably park at the target parking position P0 in the target parking space 22.

Additionally or alternatively, when the distance D1 as a difference between the target parking position P0 and the actual parking position P1 is a length longer than the preliminarily set evaluation threshold for the parking process, the parking assistance device 100 determines that the parking in the manual mode has failed and parking toward the target parking space 22 is necessary again. This allows a determination to be appropriately made as to whether or not the parking has failed, taking into consideration an error that occurs in the parking operation in the manual mode.

Additionally or alternatively, when determining that the parking of the subject vehicle V1 has failed and parking toward the target parking space 22 is necessary again, the parking assistance device 100 outputs to the display 13, which is a user interface, the guidance information for switching the parking mode of the subject vehicle V1 from the manual mode to the automated mode. This guidance information includes the confirmation displays 31, 32, and 33 with which it is possible to select whether or not to switch the parking mode of the subject vehicle V1 from the manual mode to the automated mode. When an instruction to switch the parking mode of the subject vehicle V1 is input to the display 13 based on these confirmation displays 31, 32, and 33, the parking assistance device 100 switches the parking mode of the subject vehicle V1 from the manual mode to the automated mode to assist the parking of the subject vehicle V1. That is, the parking assistance device 100 executes the parking control for the subject vehicle V1 to park into the target parking space 22. On the other hand, when the instruction to switch the parking mode of the subject vehicle V1 is not input to the display 13 or when the manual mode is selected by an occupant, the parking mode of the subject vehicle V1 is maintained in the manual mode.

Through this operation, it is possible to select whether or not the parking assistance is performed by the parking assistance device 100 when retrying the parking, in accordance with the intention of the occupant of the subject vehicle.

Additionally or alternatively, when the instruction to switch the parking mode of the subject vehicle V1 is not input and the parking mode of the subject vehicle V1 is maintained in the manual mode, the parking assistance device 100 displays the target parking space 22 on the display 13 as a recommended space. Thus, by outputting the manual parking guidance display based on the target parking state to the display 13, even when the manual parking is retried after parking has failed, guidance can be made so as to allow the subject vehicle V1 to be more reliably parked at the target parking position P0 in the target parking space 22.

Additionally or alternatively, when an occupant selects whether or not to switch the parking mode of the subject vehicle V1 based on the confirmation display 32, information indicating that either the manual mode or the automated mode is selected based on the information selected by the occupant is output to the display 13. When an occupant selects the automated mode as the parking mode, the display 13 displays an assistance image indicating the target parking space 22. This allows the driver and the occupant to clearly confirm the current parking state of the subject vehicle V1.

Additionally or alternatively, when the parking of the subject vehicle V1 is not performed in the manual mode, that is, when the parking mode is the automated mode, the parking execution state detection unit 11 does not detect the parking execution state. This allows the parking assistance device 100 to detect the parking execution state of the subject vehicle V1 only when necessary.

The parking assistance device 100 can set the evaluation threshold lower as the parking difficulty level is higher, and can set the evaluation threshold higher as the parking difficulty level is lower. Through this setting, the higher the evaluation threshold, the less likely that the guidance information for switching from the manual mode to the automated mode is output, and the lower the evaluation threshold, the more likely that the guidance information for switching from the manual mode to the automated mode is output. That is, the parking assistance device 100 can assist parking so that the manual mode continues as the parking difficulty level is lower. In contrast, the parking assistance device 100 can assist parking so that the switching from the manual mode to the automated mode is achieved as the parking environment is an environment in which the parking difficulty level is higher, that is, an environment in which the driver is more likely to fail in parking. Thus, by setting the evaluation threshold in accordance with the parking difficulty level, the parking assistance device 100 can propose or execute the parking assistance in the automated mode at the timing when the driver fails to park in the manual mode or when a determination is made that the possibility of failure is high.

In the present embodiment, the user interface is not limited to the display 13 and may be a speaker that outputs voice, a microphone that receives voice input, or the like. The speaker as the user interface may output voice when one of the manual mode or the automated mode is selected, and may not output voice when the other is selected. The voice information when the manual mode is selected and the voice information when the automated mode is selected may be output as different voices. The voice information can be output in a form in which any two or more of the content, the volume, the frequency, the output time, the time when sound is output, and the time when sound is not output (silent time) are combined.

The display 13 is not limited to a touch panel display. That is, the driver may press a button provided around the display 13 with a finger or operate a remote controller thereby to input whether or not to switch the parking mode. Additionally or alternatively, an instruction regarding whether or not to switch the parking mode may be input by a sensor provided in the vehicle detecting the driver's utterance or gesture.

Additionally or alternatively, the display 13 may display the display information output when the manual mode is selected and the display information output when the automated mode is selected so that one of them is emphasized as compared with the other. Examples of the schemes used for emphasizing the display information include known schemes such as a scheme of increasing the size of the icon indicating the display information, a scheme of setting the color to an advancing color (a color brighter than a retreating color, a color that looks closer, or a warm color), a scheme of enhancing the brightness, and a scheme of shortening the on/off interval of lighting.

Additionally or alternatively, the display 13 may output the display information when one of the manual mode and the automated mode is selected, and may not output the display information when the other is selected. The display 13 may display, with different diagrams, the display information output when the manual mode is selected and the display information output when the automated mode is selected. The display information can be output in a form in which any two or more of the content, the shape, the color, the brightness, the time when the display information is output, and the time when the display information is not output (non-display time) are combined.

Additionally or alternatively, after the parking of the subject vehicle V1 is completed and the driver gets off the vehicle, the guidance display illustrated in FIG. 4 may be output to the screen of a terminal carried by the driver. In such a case, the driver can remotely instruct the parking assistance device 100 to execute the automated parking function to assist the retry of parking by selecting "Yes" on the confirmation display 32 on site.

Additionally or alternatively, when a determination is made that the parking has failed, the parking assistance device 100 may not output the confirmation display 31, 32, or 33, and after presenting the guidance information for switching the parking mode, the parking assistance device 100 may switch the parking mode to the automated mode to assist the parking in a state in which there is no instruction from an occupant.

Second Embodiment

The parking assistance method according to the second embodiment of the present invention will be described with reference to FIGS. 5 and 6.

The configurations and control steps related to the same reference numerals as those illustrated in FIGS. 1 to 4 have the same or similar characteristics, so detailed description will be omitted below.

As illustrated in FIG. 5, when a determination is made in step S1 that the parking mode is the manual mode, this step is followed by step S12, in which the target parking state calculation unit 5 of the parking assistance device 100 calculates a reference trajectory T0 illustrated in FIG. 6. The reference trajectory T0 is a parking trajectory calculated on the assumption that the subject vehicle V1 located at a parking start position PS1 is parked at the target parking position P0 in the target parking space 22 with one turn for parking. The reference trajectory T0 is calculated by using a parking program that is preliminarily stored to execute the automated mode. Then, the control transitions to step S13, in which the parking execution state detection unit 11 of the parking assistance device 100 detects an actual parking trajectory T1 based on the actual steering angle (steering amount) of the subject vehicle V1.

The reference trajectory T0 is calculated based on the target travel route and target traveling speed of the subject vehicle V1. The actual parking trajectory T1 is detected based on the travel route and traveling speed related to the actual parking operation of the subject vehicle V1. The reference trajectory T0 and the actual parking trajectory T1 may be trajectories from the parking start position PS1 to a target position of turn for parking PK0 and an actual position of turn for parking PK1, respectively, or may otherwise be trajectories from the time when the subject vehicle V1 starts the parking operation at the parking start position PS1 to the time when the parking is completed.

The order of step S12 and step S13 illustrated in FIG. 5 may be reversed, or these steps may be executed concurrently.

Then, the control transitions to step S14, in which the parking state determination unit 12 of the parking assistance device 100 determines, based on the difference between the reference trajectory T0 and the actual parking trajectory T1, that is, a distance D2, as illustrated in FIG. 6, whether or not the parking has failed, that is, whether or not parking toward the target parking space 22 is necessary again. Specifically, a cumulative value is obtained by integrating the distance D2 with the time for the subject vehicle V1 to reach the target position of turn for parking PK0 or the actual position of turn for parking PK1 from the parking start position PS1, and when the cumulative value is not less than a preliminarily set evaluation threshold for the parking process, a determination is made that the parking has failed and parking toward the target parking space 22 is necessary again. Additionally or alternatively, a cumulative value may be obtained by integrating the distance D2 with the time from when the subject vehicle V1 starts the parking operation at the parking start position PS1 to when the parking is completed, and when the cumulative value is not less than a preliminarily set evaluation threshold for the parking process, a determination may be made that the parking has failed. Additionally or alternatively, when the maximum value of the distance D2 is not less than a preliminarily set evaluation threshold for the parking process, a determination may be made that the parking has failed.

Whether or not the parking has failed may be determined at the timing midway through the parking operation of the subject vehicle V1, for example, at the timing of the turn for parking, or may otherwise be determined at the timing when the parking of the subject vehicle V1 is completed. The term "midway through the parking operation" refers to a situation in which the subject vehicle V1 has not reached the target parking space 22 and the parking is not completed.

The timing of outputting the guidance information for switching the parking mode from the manual mode to the automated mode may be the timing (position) of turn for parking or the timing (position) when the parking of the subject vehicle V1 is completed.

As described above, in the parking assistance method according to the present embodiment, when the parking of the subject vehicle V1 is performed in the manual mode, the parking assistance device 100 calculates the reference trajectory T0 as the target parking state. In addition, the parking assistance device 100 detects the actual parking trajectory T1 as the parking execution state. Then, on the basis of the amount of deviation, that is, the difference between the reference trajectory T0 and the actual parking trajectory T1, the parking assistance device 100 determines whether or not the parking has failed, that is, whether or not parking toward the target parking space 22 is necessary again. When determining that the parking has failed and parking toward the target parking space 22 is necessary again, the parking assistance device 100 outputs to the display 13 the guidance information for switching the parking mode of the subject vehicle V1 from the manual mode to the automated mode. Through this operation, when a deviation occurs between the reference trajectory T0 and the actual parking trajectory T1, that is, when a determination is made that the parking in the manual mode has failed, the parking assistance device 100 guides an occupant of the subject vehicle to know that the parking mode is switched to the automated mode. This allows the parking assistance device 100 to execute the automated parking function in accordance with the instruction made by the occupant of the subject vehicle, and the parking assistance device 100 can assist parking so that the subject vehicle V1 can reliably park at the target parking position P0 in the target parking space 22.

Moreover, in the parking assistance method according to the present embodiment, the parking assistance device 100 determines that the parking of the subject vehicle V1 has failed even midway through the parking operation, that is, even before the parking is completed, and the parking assistance device 100 can output the guidance information for the parking mode switching to the display 13. Thus, the parking assistance device 100 can assist the parking of the subject vehicle V1 in accordance with the instruction made by an occupant of the subject vehicle even midway through the parking operation and can guide the subject vehicle V1 to the target parking position P0 in the target parking space 22 while appropriately correcting the parking trajectory.

Furthermore, the reference trajectory T0 is calculated by using the parking program which is preliminarily stored for executing the automated mode, and therefore the reference trajectory T0 and the actual parking trajectory T1 are compared with each other thereby to further improve the accuracy of determination as to whether or not parking toward the target parking space 22 is necessary again.

Third Embodiment

The parking assistance method according to the third embodiment of the present invention will be described with reference to FIGS. 6 and 7.

As illustrated in FIG. 7, when a determination is made in step S1 that the parking mode is the manual mode, this step is followed by step S22, in which the target parking state calculation unit 5 of the parking assistance device 100 calculates the target position of turn for parking PK0 illustrated in FIG. 6. The target position of turn for parking PK0 is an optimum position of turn for parking for the subject vehicle V1 at the parking start position PS1 to park at the target parking position P0 in the target parking space 22 with one turn for parking. Then, the control transitions to step S23, in which the parking execution state detection unit 11 of the parking assistance device 100 detects the actual position of turn for parking PK1 of the subject vehicle V1 due to the actual parking operation of the subject vehicle V1.

The order of step S22 and step S23 illustrated in FIG. 7 may be reversed, or these steps may be executed concurrently.

The control transitions to step S24, in which the parking state determination unit 12 of the parking assistance device 100 determines, based on the difference between the target position of turn for parking PK0 and the actual position of turn for parking PK1, that is, a distance D3, as illustrated in FIG. 6, whether or not the parking has failed. That is, when the distance D3 is not less than a preliminarily set evaluation threshold for the parking process, a determination is made that the parking has failed and parking toward the target parking space 22 is necessary again.

Whether or not the parking has failed is determined at the timing of the turn for parking of the subject vehicle V1, and the guidance information for switching the parking mode from the manual mode to the automated mode is output also at the timing of the turn for parking.

As described above, in the parking assistance method according to the present embodiment, when the parking of the subject vehicle V1 is performed in the manual mode, the parking assistance device 100 calculates the target position of turn for parking PK0 as the target parking state. In addition, the parking assistance device 100 detects the actual position of turn for parking PK1 as the parking execution state. Then, on the basis of the amount of deviation, that is, the difference between the target position of turn for parking PK0 and the actual position of turn for parking PK1, the parking assistance device 100 determines whether or not the parking has failed, that is, whether or not parking toward the target parking space 22 is necessary again. When a determination is made that the parking has failed and parking toward the target parking space 22 is necessary again, the parking assistance device 100 outputs to the display 13 the guidance information for switching the parking mode of the subject vehicle V1 from the manual mode to the automated mode. Through this operation, when a deviation occurs between the target position of turn for parking PK0 and the actual position of turn for parking PK1, that is, when a determination is made that the parking in the manual mode has failed and parking toward the target parking space 22 is necessary again, the parking assistance device 100 guides an occupant of the subject vehicle to know that the parking mode is switched to the automated mode. This allows the parking assistance device 100 to execute the automated parking function in accordance with the instruction made by the occupant of the subject vehicle, and the parking assistance device 100 can assist the parking of the subject vehicle V1.

Moreover, in the parking assistance method according to the present embodiment, the parking assistance device 100 determines, at the timing of the turn for parking, that the parking of the subject vehicle V1 has failed and parking toward the target parking space 22 is necessary again, and the parking assistance device 100 can output the guidance information for the parking mode switching to the display 13. Thus, the parking assistance device 100 can assist the parking of the subject vehicle V1 in accordance with the instruction made by an occupant of the subject vehicle even midway through the parking operation and can guide the subject vehicle V1 to the target parking position P0 in the target parking space 22.

The parking assistance device 100 may determine, based on the distance between the target parking position P0 in the target parking space 22 and the actual position of turn for parking PK1, whether or not parking toward the target parking space 22 is necessary again.

Fourth Embodiment

The parking assistance method according to the fourth embodiment of the present invention will be described with reference to FIGS. 6 and 8.

As illustrated in FIG. 8, when a determination is made in step S1 that the parking mode is the manual mode, this step is followed by step S32, in which the target parking state calculation unit 5 of the parking assistance device 100 calculates the target position of turn for parking PK0 illustrated in FIG. 6. Step S32 is followed by step S33, in which the target parking state calculation unit 5 calculates a target posture angle A0 at the target position of turn for parking PK0. The target posture angle A0 is an optimum posture angle for the subject vehicle V1 to park at the target parking position P0 in the target parking space 22 while moving back. The posture angle is an angle of inclination of the subject vehicle V1 with reference to the direction in which the subject vehicle V1 is facing when located at the parking start position PS1, and is a value that indicates the posture of the subject vehicle V1.

Then, the control transitions to step S34, in which the parking execution state detection unit 11 of the parking assistance device 100 detects an actual posture angle A1 at the actual position of turn for parking PK1 based on the actual parking operation of the subject vehicle V1.

The order of step S32 and step S33 illustrated in FIG. 8 may be reversed, or these steps may be executed concurrently.

The control transitions to step S35, in which the parking state determination unit 12 of the parking assistance device 100 determines, based on a difference A0−A1 between the target posture angle A0 and the actual posture angle A1, as illustrated in FIG. 6, whether or not the parking has failed. That is, when the distance A0−A1 is not less than a preliminarily set evaluation threshold for the parking process, a determination is made that the parking has failed.

Whether or not the parking has failed is determined at the timing of the turn for parking of the subject vehicle V1, and the guidance information for switching the parking mode from the manual mode to the automated mode is output also at the timing of the turn for parking.

As described above, in the parking assistance method according to the present embodiment, when the parking of the subject vehicle V1 is performed in the manual mode, the parking assistance device 100 calculates the target posture angle A0 as the target parking state. In addition, the parking assistance device 100 detects the actual posture angle A1 as the parking execution state. Then, on the basis of the amount of deviation, that is, the difference between the target posture angle A0 and the actual posture angle A1, the parking assistance device 100 determines whether or not the parking has failed, that is, whether or not parking toward the target parking space 22 is necessary again. When a determination is made that the parking has failed and parking toward the target parking space 22 is necessary again, the parking assistance device 100 outputs to the display 13 the guidance information for switching the parking mode of the subject vehicle V1 from the manual mode to the automated mode. Through this operation, when a deviation occurs between the target posture angle A0 and the actual posture angle A1, that is, when a determination is made that the parking in the manual mode has failed and parking toward the target parking space 22 is necessary again, the parking assistance device 100 guides an occupant of the subject vehicle to know that the parking mode is switched to the automated mode. This allows the parking assistance device 100 to execute the automated parking function in accordance with the instruction made by the occupant of the subject vehicle, and the parking assistance device 100 can assist the parking of the subject vehicle V1.

Moreover, in the parking assistance method according to the present embodiment, the parking assistance device 100 determines, at the timing of the turn for parking, that the parking of the subject vehicle V1 has failed and parking toward the target parking space 22 is necessary again, and the parking assistance device 100 can output the guidance information for the parking mode switching to the display 13. Thus, the parking assistance device 100 can assist the parking of the subject vehicle V1 in accordance with the instruction made by an occupant of the subject vehicle even midway through the parking operation and can guide the subject vehicle V1 to the target parking position P0 in the target parking space 22.

The parking assistance device 100 may determine whether or not parking toward the target parking space 22 is necessary again, based on the actual posture angle A1 without comparing the target posture angle A0 and the actual posture angle A1 with each other.

The target posture angle A0 at the target position of turn for parking PK0 is also the inclination of a tangent line L of the reference trajectory T0. Hence, the parking execution state detection unit 11 can detect as the parking execution state the difference A0−A1 between the target posture angle A0 and the actual posture angle A1, that is, the posture of the subject vehicle V1 with respect to the tangent line L of the reference trajectory T0. This allows the parking state determination unit 12 to determine, based on the posture of the subject vehicle V1 with respect to the tangent line L of the reference trajectory T0, whether or not parking toward the target parking space 22 is necessary again. Moreover, the parking state determination unit 12 can determine, based on the posture of the subject vehicle V1 with respect to the tangent line L of the reference trajectory T0, whether or not parking toward the target parking space 22 is necessary again, not only at the actual position of turn for parking PK1 but also at any current position midway through the parking operation. At this time, the point on the reference trajectory T0 at which the tangent line L is calculated as the comparison target of the posture of the subject vehicle V1 is set to a position that provides the shortest distance from the current position of the subject vehicle V1. In other words, on the basis of the current position or posture of the subject vehicle V1 with respect to the target parking space 22, a determination is made as to whether or not parking toward the target parking space 22 is necessary again.

Additionally or alternatively, the parking state determination unit 12 can determine, based on the current position of the subject vehicle V1 with respect to the reference trajectory T0, whether or not parking toward the target parking space 22 is necessary again. That is, on the basis of the shortest distance (e.g., the distance D2 in FIG. 6) between any current position of the subject vehicle V1 midway through the parking operation and the reference trajectory T0, a determination is made as to whether or not parking toward the target parking space 22 is necessary again. Also in this case, in other words, on the basis of the current position of the subject vehicle V1 with respect to the target parking space 22, a determination is made as to whether or not parking toward the target parking space 22 is necessary again.

Additionally or alternatively, the parking state determination unit 12 may detect as the parking execution state the number of times an occupant operates the shift of the subject vehicle V1 to switch between forward and reverse and determine, based on the number of times the subject vehicle V1 switches between forward and reverse, whether or not parking toward the target parking space 22 is necessary again.

The determination as to whether or not parking toward the target parking space 22 is necessary again may be performed by appropriately combining the determination methods according to the above first to fifth embodiments. Specifically, scores may be assigned to the determination results of each determination method, and a determination may be made based on the total score as to whether or not parking toward the target parking space 22 is necessary again. The determination results may be assigned with weighted scores for respective determination schemes.

Fifth Embodiment

The parking assistance method according to the fifth embodiment of the present invention will be described with reference to FIGS. 3, 9, and 10.

As illustrated in FIG. 9, when a determination is made in step S1 that the parking mode is the manual mode, this step is followed by step S42, in which the target parking state calculation unit 5 of the parking assistance device 100 calculates a threshold for the number of turns for parking. The threshold for the number of turns for parking is a maximum value of the number of turns for parking that is allowed for the subject vehicle V1 to smoothly park at the target parking position P0 in the target parking space 22.

The target parking state calculation unit 5 of the parking assistance device 100 calculates a parking difficulty level for the target parking space 22 based on the size of the target parking space 22 illustrated in FIG. 3 and calculates the threshold for the number of turns for parking based on the parking difficulty level.

Additionally or alternatively, the target parking state calculation unit 5 may refer to a history of the number of turns for parking 40 illustrated in FIG. 10 and calculate the threshold for the number of turns for parking based on the history of the number of turns for parking 40. The history of the number of turns for parking 40 stored in the parking assistance device 100 is a history that records the relationship between the parking difficulty level and the number of turns for parking that are performed in past times until the parking mode of the subject vehicle V1 is switched from the manual mode to the automated mode or the number of turns for parking that are performed until the parking succeeds while maintaining the parking mode in the manual mode.

As illustrated in FIG. 10, in the history of the number of turns for parking 40, the parking difficulty level calculated in the past manual parking, the success or failure of the manual parking, and the number of turns for parking performed until the parking success or the give-up are recorded so as to be associated with one another. The success of the manual parking refers to a situation in which the driver can park the vehicle into the target parking space without switching to the automated mode while the parking mode is in the manual mode. The give-up refers to a situation in which the driver initially tries to park the vehicle into the target parking space while the parking mode is in the manual mode, but switches the parking mode to the automated mode midway through the parking operation. When the threshold for the number of turns for parking is calculated based on the history of the number of turns for parking 40, for example, the maximum value of the number of turns for parking performed until the successful parking is calculated as the threshold for the number of turns for parking in accordance with the parking difficulty level. In the example illustrated in FIG. 10, therefore, when the parking difficulty level is "normal," the threshold for the number of turns for parking is three. On the other hand, when there is no history of successful parking, for example, the minimum value of the number of turns for parking until the give-up is calculated as the threshold for the number of turns for parking. In the example illustrated in FIG. 10, therefore, when the parking difficulty level is "difficult," the threshold for the number of turns for parking is also three.

The history of the number of turns for parking 40 may be a set of data pieces recorded for the subject vehicle V1 or may also be data associated with each user information item when there is a plurality of users of the subject vehicle V1.

Subsequently, after calculating the threshold for the number of turns for parking in step S42, the control transitions to step S43, in which the target parking state calculation unit 5 counts and detects the actual number of turns for parking during the turns for parking of the subject vehicle V1.

The order of step S42 and step S43 illustrated in FIG. 9 may be reversed, or these steps may be executed concurrently.

The control transitions to step S44, in which the parking state determination unit 12 of the parking assistance device 100 compares the actual number of turns for parking with the threshold for the number of turns for parking during the turns for parking of the subject vehicle V1 at any time. Then, in step S45, the parking state determination unit 12 determines whether or not the subject vehicle V1 has successfully parked with the actual number of turns for parking which is not more than the threshold for the number of turns for parking. When the subject vehicle V1 has successfully parked with the actual number of turns for parking which is not more than the threshold for the number of turns for parking, the control is concluded. On the other hand, when the subject vehicle V1 has not successfully parked with the actual number of turns for parking which is not more than the threshold for the number of turns for parking, that is, when the actual number of turns for parking exceeds the threshold for the number of turns for parking, the parking state determination unit 12 determines that parking has failed, and the control transitions to step S5.

As described above, in the parking assistance method according to the present embodiment, when the parking of the subject vehicle V1 is performed in the manual mode, the parking assistance device 100 calculates the threshold for the number of turns for parking as the target parking state. In addition, the parking assistance device 100 detects the actual number of turns for parking due to the actual parking operation of the subject vehicle V1 as the parking execution state. Then, when the actual number of turns for parking exceeds the threshold for the number of turns for parking until the subject vehicle V1 completes the parking, the parking assistance device 100 determines that the parking of the subject vehicle V1 has failed and parking toward the target parking space 22 is necessary again. Through this operation, the parking assistance device 100 determines, at the timing of the turn for parking, that the parking of the subject vehicle V1 has failed, and can output the guidance information for the parking mode switching to the display 13. Thus, the parking assistance device 100 can assist the parking of the subject vehicle V1 in accordance with the instruction made by an occupant of the subject vehicle even midway through the parking operation and can guide the subject vehicle V1 to the target parking position P0 in the target parking space 22.

Moreover, the parking assistance device 100 calculates the parking difficulty level for the target parking space 22 based on the size of the target parking space 22 in which the subject vehicle V1 is to park or the size of the surrounding space 20a adjacent to the target parking space 22, and calculates the threshold for the number of turns for parking based on the parking difficulty level. This allows the parking assistance device 100 to calculate a more appropriate threshold for the number of turns for parking in accordance with the actual situation of the parking lot.

Furthermore, the parking assistance device 100 calculates, based on the history of the number of turns for parking 40, the threshold for the number of turns for parking in accordance with the parking difficulty level. The history of the number of turns for parking 40 is a history that records the relationship between the parking difficulty level and the number of turns for parking that are performed in past times until the parking mode of the subject vehicle V1 is switched from the manual mode to the automated mode or the number of turns for parking that are performed until the parking succeeds while maintaining the parking mode in the manual mode. This allows the parking assistance device 100 to calculate a more appropriate threshold for the number of turns for parking not only based on the actual situation of the parking lot but also based on the driver's driving skill.

DESCRIPTION OF REFERENCE NUMERALS

100 Parking assistance device
11 Parking execution state detection unit
12 Parking state determination unit
13 Display (user interface)
15 Controller
16 Sensors
20a Surrounding space
22 Target parking space
31, 32, 33 Confirmation display
40 History of number of turns for parking
V1 Subject vehicle
P1 Actual parking position
T0 Reference trajectory
T1 Actual parking trajectory
PK0 Target position of turn for parking
PK1 Actual position of turn for parking
A0 Target posture angle
A1 Actual posture angle
L Tangent line of reference trajectory

The invention claimed is:

1. A parking assistance method for performing parking assistance for a subject vehicle using a parking assistance device comprising a controller configured to output assistance information for an occupant of the subject vehicle based on traveling information of the subject vehicle detected by a sensor, the method to be executed by the controller, comprising:

determining, based on the traveling information, whether parking of the subject vehicle is performed in a manual mode or an automated mode in which parking control is executed to park the subject vehicle into a target parking space;

when the parking of the subject vehicle is performed in the manual mode, detecting a parking execution state of the subject vehicle;

determining, based on the parking execution state, whether or not the parking toward a target parking space is necessary again;

when a determination is made that the parking toward the target parking space is necessary again, outputting, to a user interface, guidance information for switching a parking mode of the subject vehicle from the manual mode to the automated mode; and when the parking control is executed in the automated mode, not performing a control for outputting the guidance information for switching the parking mode.

2. The parking assistance method according to claim 1, comprising:

detecting a current position of the subject vehicle with respect to the target parking space as the parking execution state; and determining, based on the current position of the subject vehicle with respect to the target parking space, whether or not the parking toward the target parking space is necessary again.

3. The parking assistance method according to claim 1, comprising:

detecting a posture of the subject vehicle with respect to the target parking space as the parking execution state; and determining, based on the posture of the subject vehicle with respect to the target parking space, whether or not the parking toward the target parking space is necessary again.

4. The parking assistance method according to claim 1, comprising:

calculating a reference trajectory for the subject vehicle to park into the target parking space;

detecting a current position of the subject vehicle with respect to the reference trajectory as the parking execution state; and determining, based on the current position of the subject vehicle with respect to the reference trajectory, whether or not the parking toward the target parking space is necessary again.

5. The parking assistance method according to claim 1, comprising:

calculating a reference trajectory for the subject vehicle to park into the target parking space;

detecting a posture of the subject vehicle with respect to a tangent line of the reference trajectory as the parking execution state; and determining, based on the posture of the subject vehicle with respect to the tangent line of the reference trajectory, whether or not the parking toward the target parking space is necessary again.

6. The parking assistance method according to claim 4, comprising calculating the reference trajectory from a parking program that is preliminarily stored for executing the automated mode.

7. The parking assistance method according to claim 1, comprising:

detecting as the parking execution state a number of times the occupant operates a shift of the subject vehicle to switch between forward and reverse; and determining, based on the number of times the subject vehicle switches between forward and reverse, whether or not the parking toward the target parking space is necessary again.

8. The parking assistance method according to claim 1, comprising:

calculating, as a target parking state, a target parking position that is set in the target parking space;

when the parking of the subject vehicle is performed in the manual mode, detecting an actual parking position upon completion of the parking of the subject vehicle as the parking execution state; and determining, based on a difference between the target parking position and the actual parking position, whether or not the parking toward the target parking space is necessary again.

9. The parking assistance method according to claim 1, comprising:

when the parking of the subject vehicle is performed in the manual mode, calculating a target position of turn for parking for the subject vehicle to park into the target parking space as a target parking state and detecting an actual position of turn for parking due to an actual parking operation of the subject vehicle as the parking execution state; and determining, at timing of the turn for parking, based on a difference of the actual position of turn for parking with respect to the target position of turn for parking, whether or not the parking toward the target parking space is necessary again.

10. The parking assistance method according claim 1, comprising, when a difference between the parking execution state and a target parking state is not less than a evaluation threshold that is preliminarily set for a parking process, determining that the parking toward the target parking space is necessary again.

11. The parking assistance method according to claim 10, comprising:

calculating a parking difficulty level for the target parking space based on a size of the target parking space or a size of a surrounding space adjacent to the target parking space; and setting the evaluation threshold lower as the parking difficulty level is higher while setting the evaluation threshold higher as the parking difficulty level is lower.

12. The parking assistance method according to claim 1, comprising:

when a determination is made that the parking toward the target parking space is necessary again, outputting the guidance information;

then switching the parking mode of the subject vehicle from the manual mode to the automated mode; and executing parking control for the subject vehicle to park into the target parking space.

13. The parking assistance method according to claim 1 comprising:

when a determination is made that the parking toward the target parking space is necessary again, outputting to the user interface the guidance information for switching the parking mode of the subject vehicle from the manual mode to the automated mode, the guidance information including a confirmation display with which it is possible to select whether or not to switch the parking mode of the subject vehicle from the manual mode to the automated mode; and when the occupant of the subject vehicle selects whether or not to switch the parking mode of the subject vehicle based on the confirmation display, outputting information indicating that either the manual mode or the automated mode is selected to the user interface based on information selected by the occupant of the subject vehicle.

14. The parking assistance method according to claim 1, wherein:

the guidance information includes a confirmation display with which it is possible to select whether or not to switch the parking mode of the subject vehicle from the manual mode to the automated mode, the method further comprising:

when the occupant of the subject vehicle selects the automated mode, executing parking control for the subject vehicle to head for the target parking space; and when the occupant of the subject vehicle selects the manual mode, maintaining the parking mode of the subject vehicle in the manual mode.

15. The parking assistance method according to claim 1, wherein the guidance information includes a confirmation display with which it is possible to select whether or not to switch the parking mode of the subject vehicle from the manual mode to the automated mode, the method further comprising:

when the occupant of the subject vehicle selects the automated mode, displaying an assistance image indicating the target parking space; and when the occupant of the subject vehicle selects the manual mode, maintaining the parking mode of the subject vehicle in the manual mode.

16. The parking assistance method according to claim 1, wherein the guidance information includes a confirmation display with which it is possible to select whether or not to switch the parking mode of the subject vehicle from the manual mode to the automated mode, the method further comprising:

when an instruction to switch the parking mode of the subject vehicle is input to the user interface based on the confirmation display, switching the parking mode of the subject vehicle from the manual mode to the automated mode and executing parking control for the subject vehicle to head for the target parking space; and when the instruction to switch the parking mode of the subject vehicle is not input to the user interface based on the confirmation display, maintaining the parking mode of the subject vehicle in the manual mode.

17. The parking assistance method according to claim 1, comprising outputting a manual parking guidance display to the user interface when an instruction to switch the parking mode of the subject vehicle is not input to the user interface and the parking mode of the subject vehicle is maintained in the manual mode.

18. The parking assistance method according to claim 1, comprising:

calculating a parking difficulty level for the target parking space based on a size of the target parking space or a size of a surrounding space adjacent to the target parking space;

referring to a history of a number of turns for parking that records a relationship between the parking difficulty level and the number of turns for parking that are performed in past times until the parking mode of the subject vehicle is switched from the manual mode to the automated mode or the number of turns for parking that are performed until the parking succeeds while maintaining the parking mode in the manual mode;

calculating, based on the history of the number of turns for parking, a threshold for the number of turns for parking in accordance with the parking difficulty level;

detecting an actual number of turns for parking due to an actual parking operation of the subject vehicle as the parking execution state; and when the actual number of turns for parking of the subject vehicle exceeds the threshold for the number of turns for parking until the subject vehicle completes the parking, determining that the parking toward the target parking space is necessary again.

19. The parking assistance method according to claim 1, comprising determining, based on the traveling information, whether or not the parking of the subject vehicle is performed in the manual mode, wherein when the parking of the subject vehicle is not performed in the manual mode, the parking execution state is not detected.

20. A parking assistance method for performing parking assistance for a subject vehicle using a parking assistance device comprising a controller configured to output assistance information for an occupant of the subject vehicle based on traveling information of the subject vehicle detected by a sensor, the method to be executed by the controller, comprising:

determining, based on the traveling information, whether parking of the subject vehicle is performed in a manual mode or an automated mode in which parking control is executed to park the subject vehicle into a target parking space;

when the parking of the subject vehicle is performed in the manual mode, referring to a turnover count history which records the number of turns for parking that are performed in past times until a parking mode of the subject vehicle is switched from the manual mode to the automated mode or the number of turns for parking that are performed until the parking succeeds while maintaining the parking mode in the manual mode;

calculating a threshold for the number of turns for parking based on the turnover count history;

detecting an actual number of turns for parking times by an actual parking operation of the subject vehicle;

when the actual number of turns for parking exceeds the threshold for the number of turns for parking, determining that the parking toward a target parking space is necessary again, when a determination is made that the parking toward the target parking space is necessary again, outputting, to a user interface, guidance information for switching a parking mode of the subject vehicle from the manual mode to the automated mode.

21. A parking assistance device comprising a controller configured to output assistance information for an occupant of a subject vehicle based on traveling information of the subject vehicle detected by a sensor, the controller configured to:

determine, based on the traveling information, whether parking of the subject vehicle is performed in a manual mode or an automated mode in which parking control is executed to park the subject vehicle into a target parking space;

when the parking of the subject vehicle is performed in the manual mode, detect a parking execution state of the subject vehicle;

determine, based on the parking execution state, whether or not the parking toward a target parking space is necessary again;

when a determination is made that the parking toward the target parking space is necessary again, output, to a user interface, guidance information for switching a parking mode of the subject vehicle from the manual mode to the automated mode; and when the parking control is executed in the automated mode, not perform a control for outputting the guidance information for switching the parking mode.

* * * * *